Dec. 24, 1929. R. R. KEITH 1,740,738
RIM FOR MOTOR TRUCK WHEELS
Filed Dec. 8, 1927 2 Sheets-Sheet 1
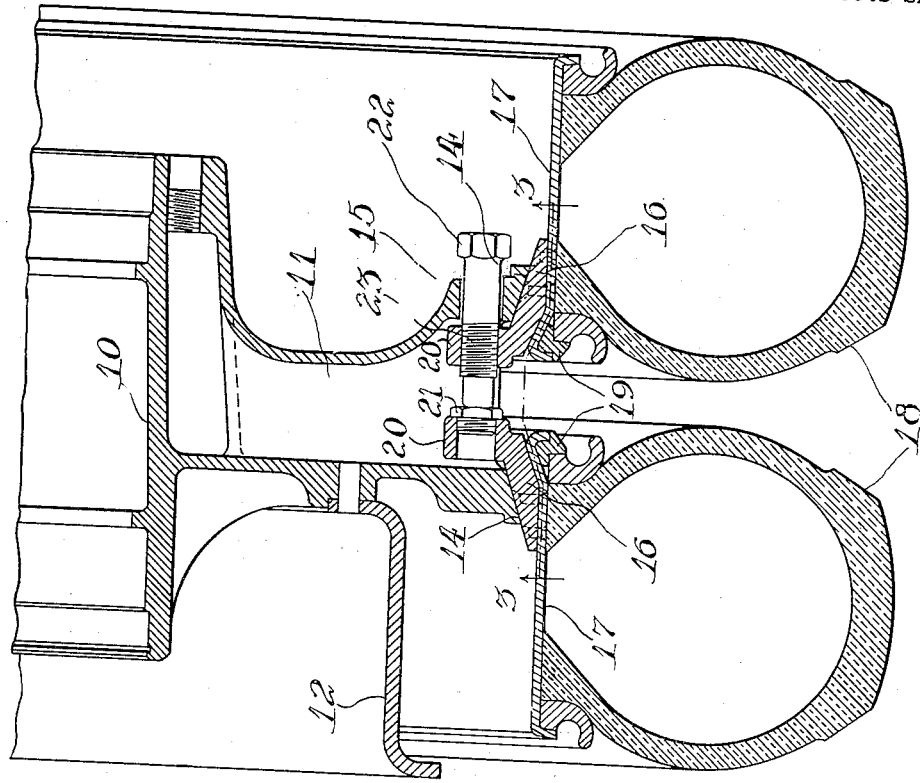
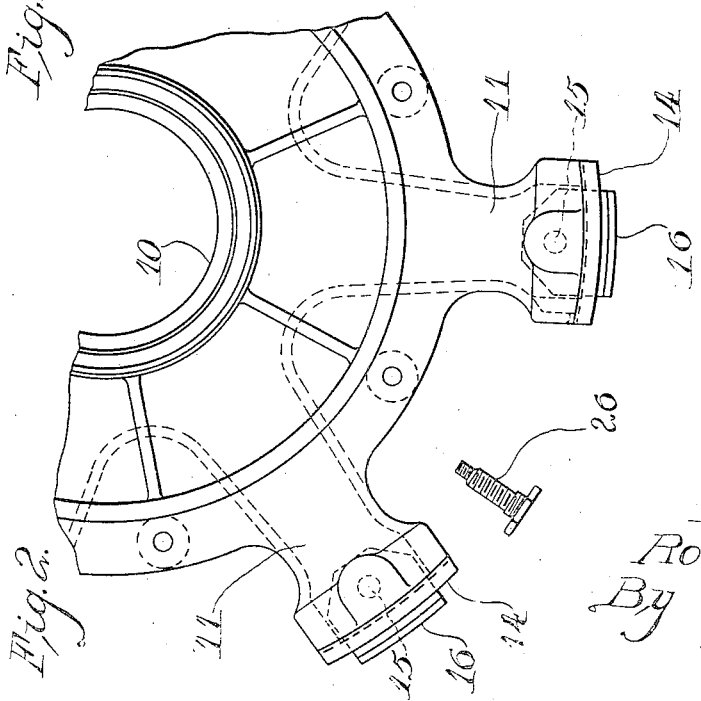
Inventor.
Robert R. Keith.
By W. R. Doolittle
Atty.

Dec. 24, 1929.　　　　　R. R. KEITH　　　　　1,740,738
RIM FOR MOTOR TRUCK WHEELS
Filed Dec. 8, 1927　　　2 Sheets-Sheet 2
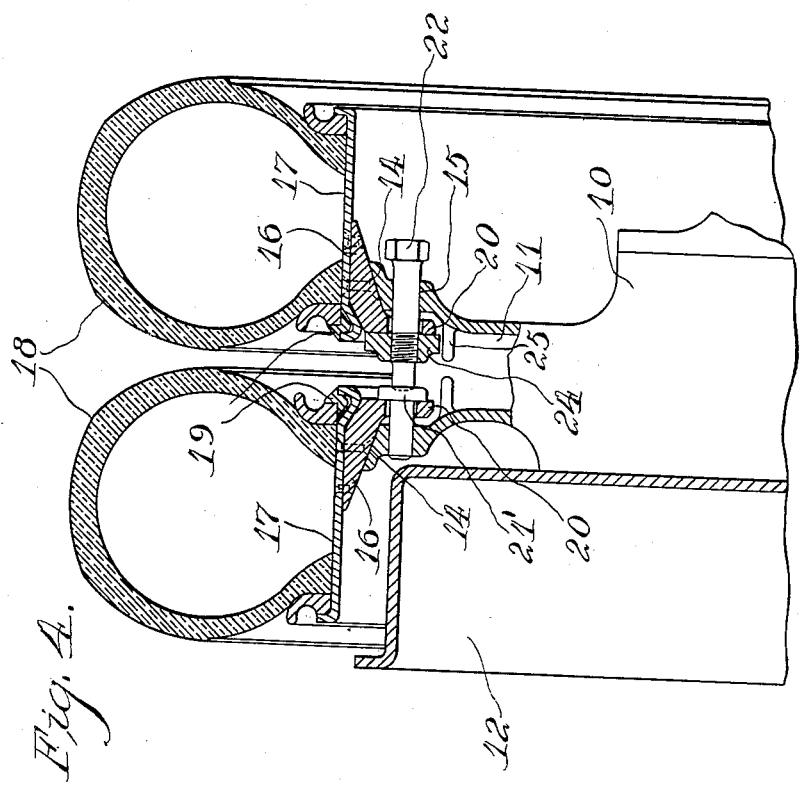
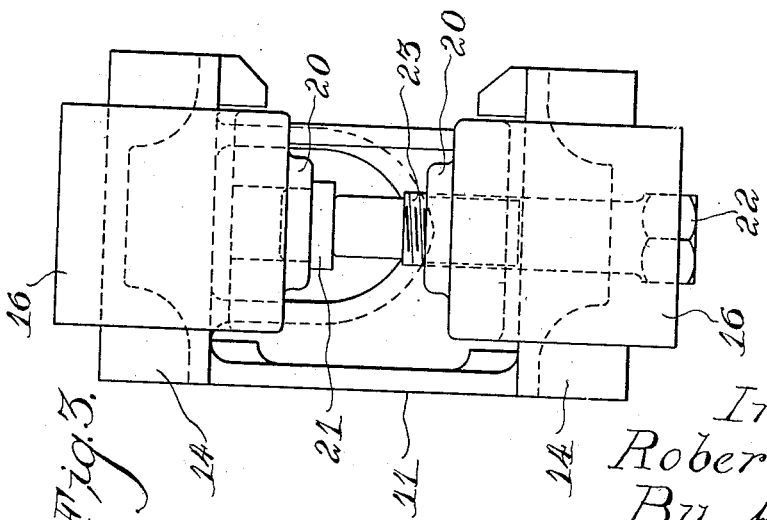
Inventor.
Robert R. Keith.
By W. P. Doolittle
Atty.

Patented Dec. 24, 1929

1,740,738

UNITED STATES PATENT OFFICE

ROBERT R. KEITH, OF HINSDALE, ILLINOIS, ASSIGNOR TO INTERNATIONAL HARVESTER COMPANY, A CORPORATION OF NEW JERSEY

RIM FOR MOTOR-TRUCK WHEELS

Application filed December 8, 1927. Serial No. 238,496.

This invention has to do with motor vehicle wheels of the demountable rim class. More particularly it relates to that type of wheel wherein two demountable rims for pneumatic or other tires are positioned side by side on the wheel. Wheels of this class are now commonly coming into use as driving wheels for heavy duty motor trucks and busses.

The objects of this invention are to provide a simple structure whereby these rims may be easily and quickly detached from the wheel for the purpose of making tire replacements or repairs; to provide such structure which will rigidly secure the rims to the wheel; to provide such clamping structure which may be interchangeably used on either the inner or the outer demountable rim; to provide such structure which is readily accessible and can be manipulated with a minimum of effort; and, lastly, to provide such a rim clamping structure which is so simple that it can be manufactured at low cost.

Other objects will be apparent from the following description and accompanying drawings.

Briefly stated, these desirable objects are accomplished in the combination with a wheel of spoke or disc form provided with wedging surfaces, of demountable rims, said rims provided at spaced intervals with attached wedging members adapted to line up with and be locked on the wedging surfaces. The wedges on the rims include inward extensions which are apertured whereby these rim wedges may receive an abutment stud and whereby a locking bolt may be passed through the wheel structure and through a rim wedge and bear against the abutment on an opposing inner rim wedge for spreading apart adjacent aligned wedges with an equalized pressure, securely to clamp the demountable rims to the wheel structure.

In the accompanying sheets of drawings illustrating two practical forms which this invention may assume in practice,—

Figure 1 is a sectional view through a portion of a wheel structure showing an inner and outer demountable rim with tires;

Figure 2 is a face view of a segment of a wheel as seen from the outer side with the rim and tire removed;

Figure 3 is a view looking radially inward as seen along the section line 3—3 of Figure 1 with the rim removed; and Figure 4 is a view similar to Figure 1, but showing a modified form of demountable rim clamping structure.

Referring to the drawings, it will be seen that there has been shown a vehicle wheel having a hub 10, spokes 11, and a brake drum 12. Each spoke terminates at its free end in opposite tapered or wedging surfaces 14, one face of each spoke adjacent the taper being formed with a lateral opening 15, as shown in Figure 1.

These wedging surfaces 14 of each spoke are designed to receive complementarily formed wedging blocks 16 to which are fastened in a conventional manner the demountable rims 17, which conventionally carry pneumatic or other tires 18.

All of the wedge blocks 16 on the rims are formed with inward extensions 20, which extensions are provided with openings, which may be aligned with openings 15 in the spokes or wheel structure. The wedge members 16 on the demountable rims have their openings in their extensions 20 in the form shown in Figure 1 provided with threads. One rim has its extensions 20 fitted with threaded and headed abutment studs 21. Passed through the hole 15 in the wheel is a locking bolt 22 which is threaded at 23 threadedly to engage the opening in the extensions 20 of one rim as shown in Figure 1, said locking bolt 22 adapted to abut and bear against the stud 21 when the bolt 22 is tightened, whereby the rim wedges 16, adjacent each other, are spread apart and whereby the wedging action of said blocks 16 on the spoke tapers functions to tighten and secure the rims to the wheel.

It is to be understood that in the form shown in Figure 1 the inner and outer wedge blocks are identical in all respects and are interchangeable. This simplifies production and obviates the necessity for rights and lefts for the two rims. The abutment studs 21 in this form function to close the hole in the inner wedge extensions to protect the threads in said holes and to take the thrust of the locking bolt 22. It is to be understood in practice that the inner rim wedge block 16 could have a solid extension 20 which could take the thrust of the bolt 22, but this would necessitate the use of right and left wedge blocks, thereby complicating production. It is further to be understood that in practice these wedge blocks 16 are spaced on the demountable rims to conform with the spacing of the mating surfaces of the wheel structure so that one set of wedge blocks, that is, a wedge on the inner rim and a wedge on the outer rim, can cooperate with each spoke, and with each other.

The arrangement shown in Figure 4 is quite similar to that of Figure 1 except that the abutment stud 21' is loosely arranged in the hole in the extension of the inner wedge block 16 and additionally passes into a hole in the wheel spoke. Another departure from the form shown in Figure 1 is in the use of a threaded piece 24 into which the bolt 22 is threaded to pass therethrough and contact the abutment stud 21'. The piece 24 is restrained against rotation by means of a ledge 25 in the wheel spoke. Another structural difference is that the bolt 22 is passed loosely through the hole in the extension of the outer rim wedge blocks 16. In this form, tightening of the locking bolt 22 causes the piece 24 to wedge the outer rim outwardly and, by pressing against the abutment stud 21', causes the inner rim wedge block 16 to wedge inwardly. In this manner the rims are spread apart by an equalized wedging action on the wheel tapers to lock them securely to the wheel structure.

Let us assume that it is desired to replace the outer tire 18. This necessitates the removal of the outer demountable rim 17 which carries that tire. Such removal is quickly accomplished by the simple structure of this invention by unloosening the locking bolts 22 sufficiently to relieve the rims of the pressure of the wedging action. Such loosening of the parts permits the operator to turn the outer demountable rim rotatively a distance slightly greater than the width of the wedging blocks 16, so that the wedging blocks may clear the spokes. With the wedges cleared rotatively of the spokes, the operator need only pull the rim outwardly to remove the same, as will be understood, to make whatever repairs are necessary. This turning movement which has just been described need not be very great and in no way need interfere with the air filter plug indicated at 26 for inflating the tires. As best shown in Figure 1, a sufficient clearance is provided between the faces of the extensions 20 adjacent the spokes so that the proper take-up can be effected when tightening the parts. As these faces are parallel, such take-up obviously will be limited when the faces contact and come together. Thus, a stop action results to prevent extreme tightening of the bolt 22, thereby overcoming any tendency to uneven tightening of all the bolts 22. This stop feature thus insures even mounting and true running of the rims without wobble.

The same feature can be provided in the form disclosed in Figure 4, by making adjacent faces of the spokes and extensions 20 parallel, as will be obvious.

From the above description it will be seen that all the rims are constructed alike for the same purpose, and that, as a result, the construction is very practicable and can be produced at a minimum of cost. In addition, it is a simple matter to attach and detach the rims, and any problems which have heretofore existed in the use of continuous wedging rings are overcome.

While two illustrative forms of this invention have been herein shown, it is to be appreciated that the same is capable of modification and use in other forms without departing from the spirit and scope of this invention and that it is the intention to cover all such modifications as is indicated in the appended claims.

What is claimed as new is:

1. The combination with a wheel structure formed with wedging surfaces, of an inner and outer demountable rim each including spaced wedge members, said wedge members adapted to be positioned on the wedging surfaces of the wheel structure, a headed abutment member in each inner rim wedge member, and a locking bolt passing through the wheel structure and outer rim wedge members to contact the headed abutment on the inner rim wedges for securing the rims to the wheel.

2. The combination with a wheel having spokes, of an inner and outer demountable rim each including spaced wedge members adapted to be positioned on the wheel spokes, each wedge member having a radial extension formed with an opening, the openings for the adjacent inner and outer rim wedges normally arranged in lateral alinement, an abutment stud in each opening of each inner rim wedge member, and a bolt passed through each outer rim wedge extension adapted to engage the studs of the inner wedge members and to spread the wedge members for securing the rims on the spokes.

3. The combination with a wheel having spokes formed with wedging surfaces, of an inner and outer demountable rim each including spaced wedge members, said wedge members adapted to be positioned on the wedging surfaces of the spokes, an abutment for each inner rim wedge member, and a locking bolt passing through the spokes and outer rim wedge members, and means for causing the bolt to spread adjacent inner and outer rim wedge members for securing the rims to the spokes.

4. The combination with a wheel having spokes, of an inner and outer demountable rim each including spaced wedge members adapted to be positioned on the wheel spokes, each wedge member having a radial extension formed with an opening, the openings for the adjacent inner and outer rim wedges normally arranged in lateral alinement, an abutment stud removably mounted in each opening of each inner rim wedge member, and a removable bolt passed laterally through each outer rim wedge extension and threadedly engaging the same, said bolt being passed loosely through the adjacent spoke and the bolt end adapted to contact the alined abutment whereby the bolt spreads the adjacent inner and outer wedge members to secure the rims to the spokes.

In testimony whereof I affix my signature.

ROBERT R. KEITH.